United States Patent
Yoshida et al.

(10) Patent No.: US 6,369,701 B1
(45) Date of Patent: Apr. 9, 2002

(54) RENDERING DEVICE FOR GENERATING A DRIVE ASSISTANT IMAGE FOR DRIVE ASSISTANCE

(75) Inventors: Takashi Yoshida, Ikoma; Nobuhiko Yasui, Moriguchi; Atsushi Iisaka, Katano; Akira Ishida, Sakai, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/892,740

(22) Filed: Jun. 28, 2001

(30) Foreign Application Priority Data

Jun. 30, 2000 (JP) .......................................... 2000-199515

(51) Int. Cl.$^7$ ................................................. B60Q 1/00
(52) U.S. Cl. ...................... 340/435; 340/436; 340/438; 340/439; 340/461; 348/148; 348/61; 348/218; 382/104; 382/282; 382/293
(58) Field of Search ................................ 340/435, 461, 340/903, 904, 436, 438, 439; 348/148, 61, 218; 382/104, 282, 293

(56) References Cited

U.S. PATENT DOCUMENTS

| | | | |
|---|---|---|---|
| 5,670,935 A | 9/1997 | Schofield et al. | ............ 340/461 |
| 5,680,123 A | * 10/1997 | Lee | ............................. 340/937 |
| 5,949,331 A | * 9/1999 | Schofield et al. | ............ 340/461 |
| 6,218,960 B1 | * 4/2001 | Ishikawa et al. | ............ 340/901 |

FOREIGN PATENT DOCUMENTS

JP          11-78692         3/1999       ............. B60R/1/00

* cited by examiner

*Primary Examiner*—Daniel J. Wu
*Assistant Examiner*—Tai T. Nguyen
(74) *Attorney, Agent, or Firm*—Wenderoth, Lind & Ponack, L.L.P.

(57) ABSTRACT

In a rendering device Urnd, a CPU generates a lower viewpoint image based on captured images captured by image capture devices both securely mounted to a vehicle. Here, the lower viewpoint image shows a region rear of the vehicle viewed from those image capture devices. Then, the CPU executes viewpoint conversion processing onto the captured images, and generates an upper viewpoint image. Here, the upper viewpoint image shows also the region rear of the vehicle but viewed from a camera virtually placed above the vehicle. The CPU then stitches the upper and lower viewpoint images together to generate a drive assistant image. In such manner, the drive assistant image generated by the rendering device Urnd becomes informative enough for a driver of the vehicle.

23 Claims, 9 Drawing Sheets

RENDERING DEVICE FOR GENERATING A DRIVE ASSISTANT IMAGE FOR DRIVE ASSISTANCE

BACKGROUND OF THE INVENTION

1. Field of the Invention

The present invention relates to rendering devices and, more specifically, to a rendering device which can be incorporated in a drive assistant device. In more detail, the rendering device generates a drive assistant image of around a vehicle based on an image captured by an image capture device fixedly placed in the vehicle.

2. Description of the Background Art

Disclosed in U.S. Pat. No. 5,670,935 is an exemplary conventional drive assistant device, mainly including a plurality of cameras, an image processing part, and a display device. The cameras are each so affixed as to direct toward the area rear of the vehicle with respect to the vehicle's heading direction. Those cameras capture each different image of the area rear of the vehicle. Thus captured images are stitched into one in the image processing part, and the resulting stitched image is transferred to the display device for display thereon. With the stitched image displayed, the driver of the vehicle can know in what state the area rear of the vehicle is.

The stitched image offered by the conventional drive assistant device, however, is not informative enough for the driver. As a specific example, when the driver needs to control the vehicle with precise steering like at the time of parking, what the driver wants easily to know is whether his/her current steering will make the vehicle hit any obstacle observed therearound. Thus, needed by the driver in such case is an image helping him/her intuitively grasp the distance between the vehicle and the obstacle. However, the conventional stitched image hardly tells the driver such distance as is derived by simply stitching the images of the area rear of the vehicle captured by the cameras.

SUMMARY OF THE INVENTION

Therefore, an objective of the present invention is to provide a rendering device which can be incorporated in a drive assistant device, and a drive assistant image generated thereby being informative enough for the driver.

The present invention has the following features to attain the objective above.

An aspect of the present invention is directed to a rendering device for generating a drive assistant image for drive assistance. The rendering device comprises: a reception part for receiving an image captured by an image capture device placed in a vehicle; a first image generating part for generating, based on the captured image received by the reception part, a lower viewpoint image showing a surrounding region of the vehicle viewed from a first viewpoint; a second image generating part for generating, based on the captured image received by the reception part, an upper viewpoint image showing the surrounding region viewed from a second viewpoint differing from the first viewpoint; and a third image generating part for generating the drive assistant image including the lower viewpoint image generated by the first image generating part and the upper viewpoint image generated by the second image generating part. Herein, a first angle formed between a road surface and a direction of the first viewpoint to the surrounding region is smaller than a second angle formed between the road surface and a direction of the second viewpoint to the surrounding region.

These and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
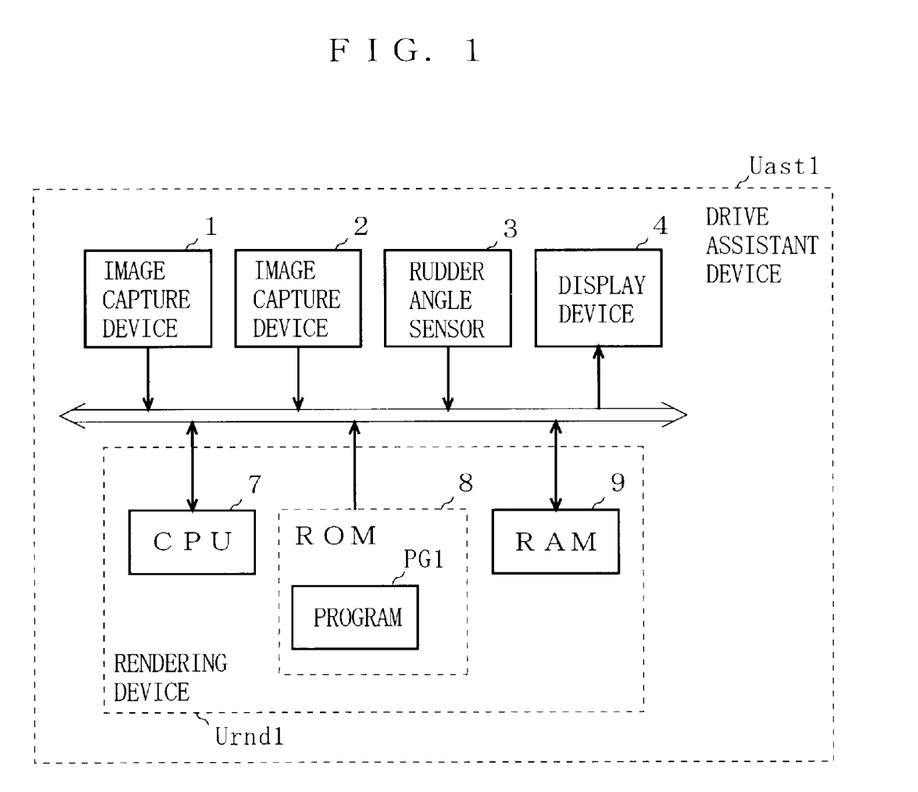
FIG. 1 is a block diagram showing the hardware structure of a drive assistant device Uast1 incorporating a rendering device Urnd1 according to an embodiment of the present invention.

FIG. 1 is a block diagram showing the hardware structure of a drive assistant device Uast1 incorporating a rendering device Urnd1 according to an embodiment of the present invention. In FIG. 1, the drive assistant device Uast1 is mounted in a vehicle Vusr (see FIGS. 2A and 2B), and includes two image capture devices 1 and 2, a rudder angle sensor 3, a display device 4, and the rendering device Urnd1.

Figure 2A:
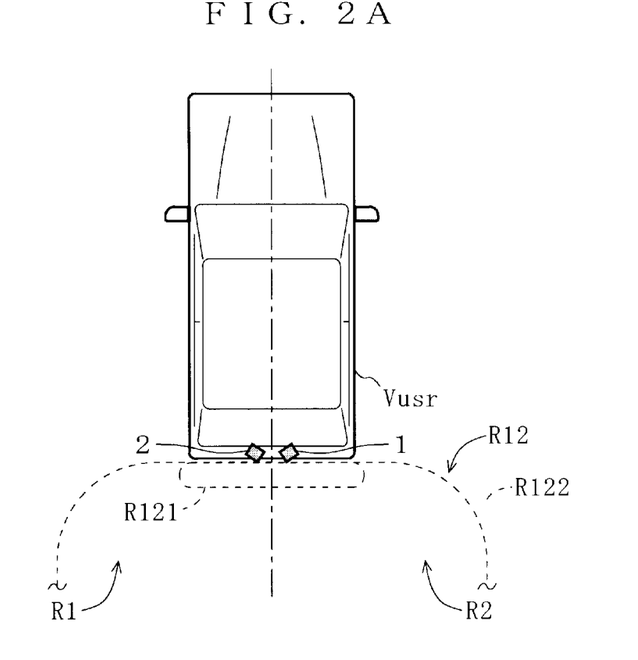
FIGS. 2A and 2B are diagrams for illustrating in detail where the image capture devices 1 and 2 shown in FIG. 1 are mounted in the vehicle.
Figure 2B:
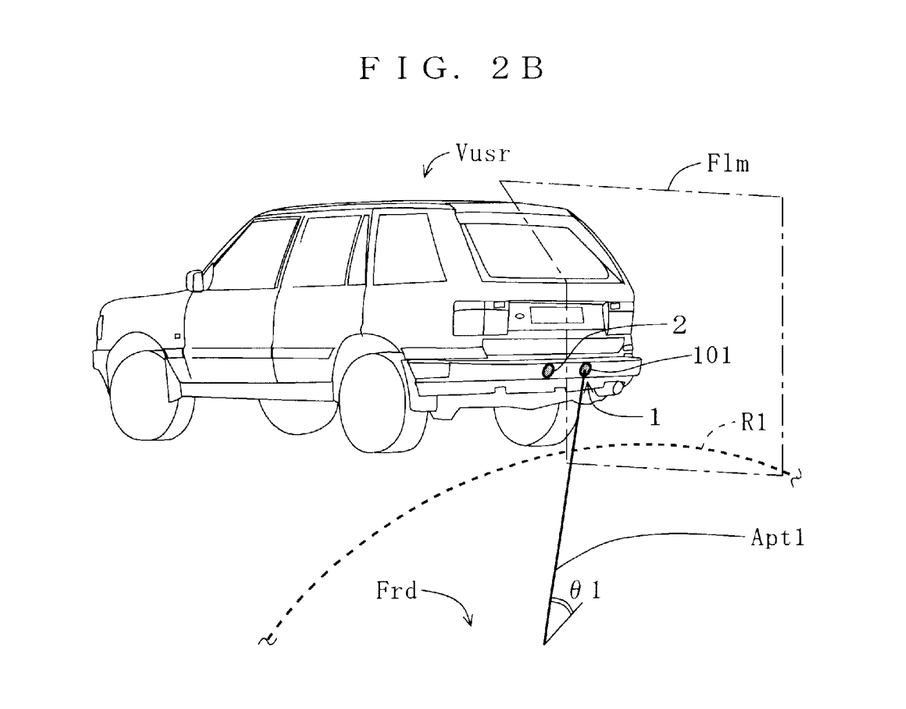

FIGS. 2A and 2B are diagrams for illustrating in detail where the image capture devices 1 and 2 are mounted in the vehicle. FIG. 2A shows the vehicle Vusr viewed from the top, while FIG. 2B the vehicle Vusr viewed from the rear-left side. As shown in FIG. 2A, the image capture devices 1 and 2 are each securely mounted to the vehicle Vusr so that an image of a rear region R12 behind the vehicle Vusr is captured thereby. In the present embodiment, the rear region R12 includes a blind-spot region R121, which is a part where the driver has difficulty to see when moving the vehicle Vusr backward, and typically an area underneath the rear bumper of the vehicle Vusr. The rear region R12 also includes an away region R122 which is beyond the blind-spot region R121. The image capture device 1 is in charge of a region R1, which is substantially the left-half of the rear region R12 with respect to a longitudinal median plane Flm (see a one-dotted line) of the vehicle Vusr. A region R2 being the right-half of the rear region R12 is taken charge by the image capture device 2.

Figure 3:
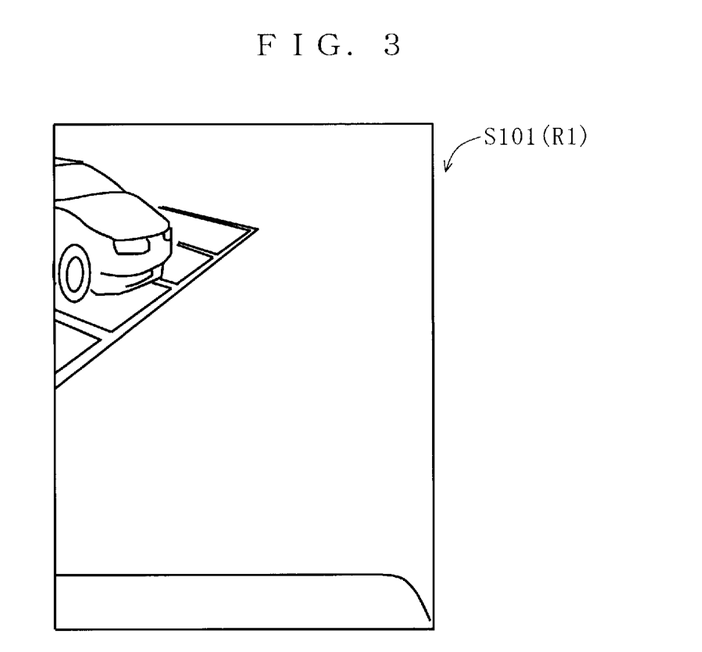
FIG. 3 is a diagram showing an exemplary captured image S101 generated by the image capture device 1 of FIG. 1.

Here, as shown in FIGS. 2A and 2B, the image capture device 1 is securely mounted to the rear-end (e.g., rear bumper) of the vehicle Vusr with a predetermined space to the right from the longitudinal median plane Flm (seethe one-dotted line). The image capture device 1 has a lens 101. An optical axis Apt1 of the lens 101 is directed to the region R1, and forms an angle of θ1 with a road surface Frd. Viewing the region R1 from the lens 101, the image capture device 1 captures such captured image S101 as shown in FIG. 3. Here, the mounting position of the lens 101 is one example of a first viewpoint in Claims. Also, the angle θ1 is one example of a first angle in Claims.

As shown in FIGS. 2A and 2B, the image capture devices 1 and 2 are symmetrically placed with respect to the longitudinal median plane Flm. Thus, the mounting position of the image capture device 2 is not described in detail here. In the below, an image captured by the image capture device 2 is referred to as a captured image S102.

Described next is the angle θ1 about what value is considered appropriate therefor. As the angle θ1 decreases to 0 degree, the captured images S101 and S102 include the less blind-spot region R121. Conversely, as the angle θ1 increases to 90 degrees, the captured images S101 and S102 include only the away region R122 in a narrow range. As such, also with the height of the image capture devices 1 and 2 from the road surface Frd considered, the angle θ1 is set to a value considered appropriate.

In FIG. 1, the rudder angle sensor 3 detects a rudder angle φ of the steering wheel of the vehicle Vusr. The detected rudder angle φ is transmitted to a CPU 7. In this embodiment, the rudder angle φ indicates at what angle the steering wheel is turned with respect to the initial position. The steering wheel is considered in the initial position when not turned, that is, when the vehicle Vusr is in the straight-ahead position. The rudder angle φ may indicate at what angle the wheels of the vehicle Vusr are rotated responding to the driver's steering.

The display device 4 is typically a liquid crystal display, and displays a drive assistant image S201 to be generated by the rendering device Urnd1.

The rendering device Urnd1 includes the CPU 7, ROM 8, and RAM 9. The ROM 8 stores a program PG1 for defining the processing procedure of the CPU 7. By following the program PG1, the CPU 7 generates the drive assistant image S201. At the time of execution of the program PG1, the CPU 7 uses the RAM 9 as a working area.

Figure 4:
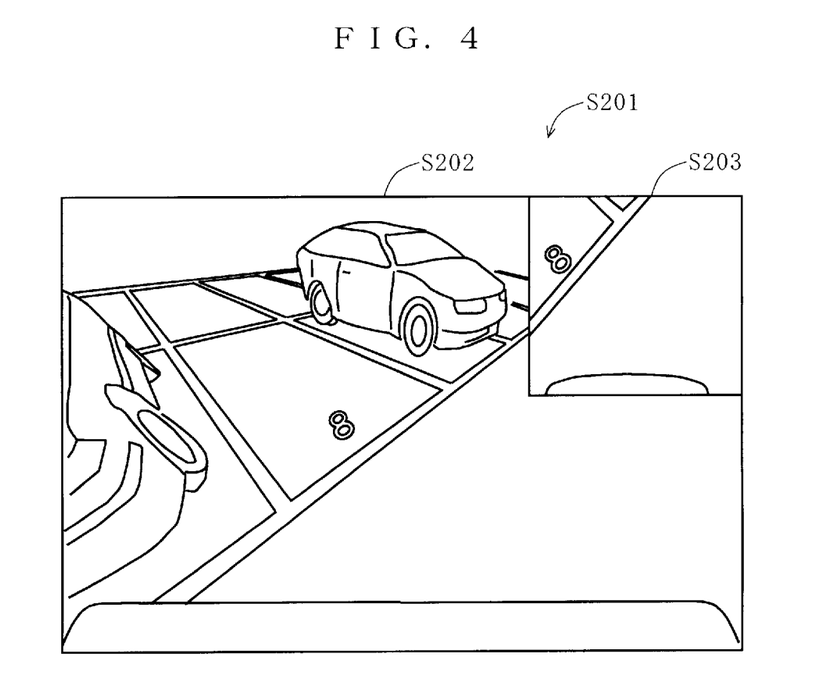
FIG. 4 is a diagram showing an exemplary drive assistant image S201 generated by a CPU 7 of FIG. 1.
Figure 5:
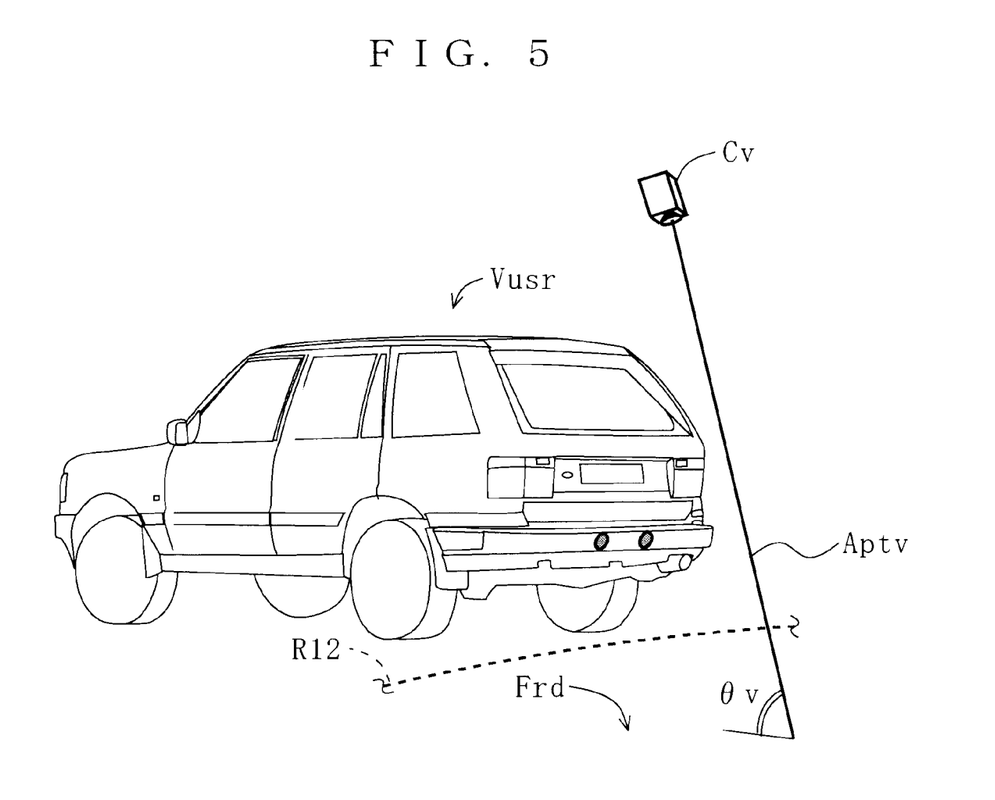
FIG. 5 is a diagram showing a position of a virtual camera Cv needed for generating an upper viewpoint image S203 shown in FIG. 4.

FIG. 4 shows one example of the drive assistant image S201. In FIG. 4, the drive assistant image S201 includes a lower viewpoint image S202 and an upper viewpoint image S203, at least one of each. In this embodiment, for convenience, the lower viewpoint image S202 is presumably derived by stitching the captured images S101 and S102. Accordingly, the lower viewpoint image S202 shows the rear region R12 viewed from the viewpoints of the image capture devices 1 and 2. On the other hand, the upper viewpoint image S203 shows the rear region R12 viewed from a virtual camera Cv, which is virtually placed above the vehicle Vusr as shown in FIG. 5. Here, the line of sight of the virtual camera Cv, that is, a virtual optical axis Aptv is directed to the rear region R12, and forms an angle of θv with the road surface Frd. The angle θv is set larger than the angle θ1.

Here, the viewpoint of the virtual camera Cv is one example of a second viewpoint in Claims. Also, the angle θv is one example of a second angle in Claims. Further, the upper viewpoint image S203 in the above is generated based on the captured images S101 and S102 by the well-known viewpoint conversion processing(see International Publication WO00-07373, for example).

With such upper viewpoint image S203 showing the rear region R12 from the above, the driver finds it easy to determine whether the vehicle Vusr is likely to hit any obstacle (typified by other vehicles) located therearound. That is, the upper viewpoint image S203 is advantageously used as a criterion for such judgement. What is better, the driver can easily perceive the positional relationship between the vehicle Vusr and white lines defining an individual parking space. The issue here is, in the above viewpoint conversion processing, every obstacle in the captured images S101 and S102 is assumed as lying on the road surface to reduce the CPU load. The obstacles are viewed from the image capture devices 1 and 2, and projected onto the road surface to generate spatial data. Thus, the upper viewpoint image S203 generated by utilizing such spatial data has a drawback as follows.

Figure 6A:
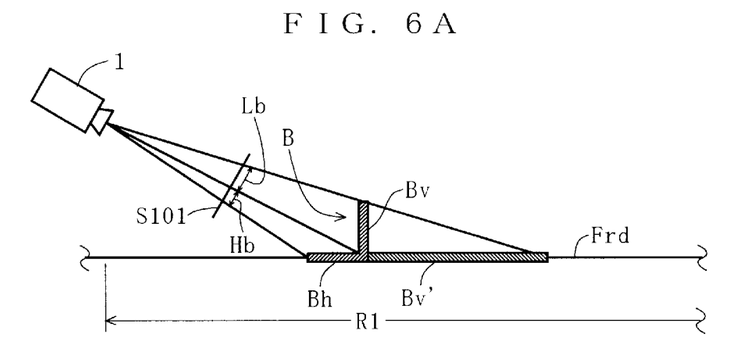
FIGS. 6A to 6C are diagrams showing a drawback of the upper viewpoint image S203 shown in FIG. 4.
Figure 6B:
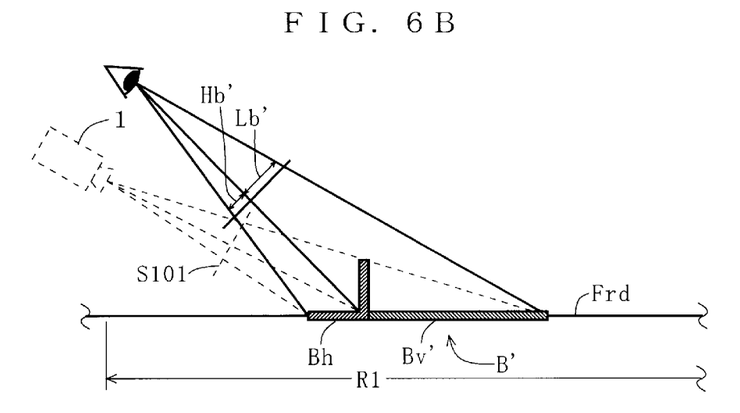

As shown in FIG. 6A, presumably, placed on the road surface Frd in the region R1 is an object B, a cross section of which is reverse "L" shaped. In the captured image S101 including the object B captured by the image capture device 1, a ratio of a vertical length Bv of the object B and a lateral length Bh thereof is presumably Hb:Lb. Here, the object B is the one viewed from the viewpoint of the image capture device 1, and projected onto the road surface Frd therefrom. FIG. 6A shows also a projected part Bv', which is obtained by projecting the vertical length Bv onto the road surface Frd. Accordingly, in the viewpoint conversion processing, viewed by the virtual camera Cv is a virtual object B' including the lateral length Bh and the projected part Bv'. As shown in FIG. 6B, when the line of sight of the virtual camera Cv and the optical axis Apt1 (not shown) are directed in the similar direction, the virtual object B' viewed from the virtual camera Cv does not look so different from the object B viewed from the image capture device 1 (see FIG. 6A). Specifically, as to the virtual object B' viewed from the virtual camera Cv, assuming that a ratio of a length of the projected part Bv' and the lateral length of the part Bh is Hb':Lb', such relation as Hb':Lb'≈Hb:Lb is established.

Figure 6C:
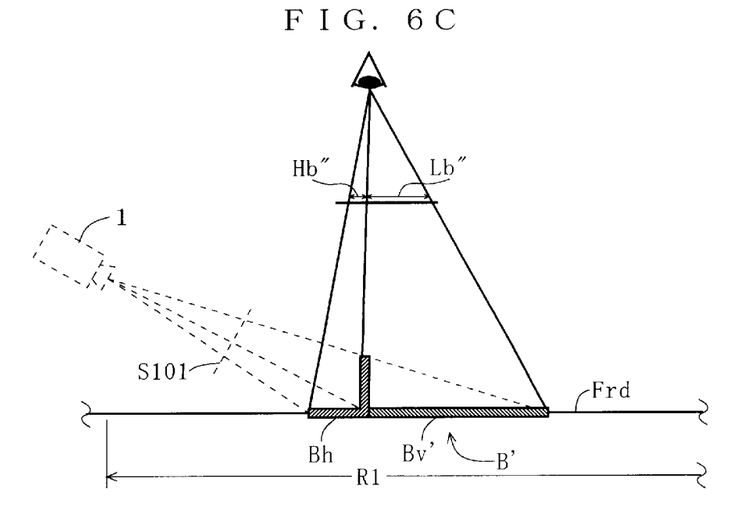

As shown in FIG. 6C, however, if the virtual camera Cv is placed above the vehicle Vusr, the line of sight thereof becomes considerably different from the direction of the optical axis Apt1 (not shown). In such case, the virtual object B' viewed from the virtual camera Cv looks rather deformed compared with the object B viewed from the image capture device 1 (See FIG. 6A). Specifically, as to the virtual object B' viewed from the virtual camera Cv, assuming that a ratio of the lateral length of the projected part Bv' and the lateral length of the part Bh is Hb":Lb", the relation as Hb':Lb'≈Hb:Lb is not satisfied but Hb"/Lb">>Hb/Lb. Consequently, the object B in the upper viewpoint image S203 looks rather different from as it actually is, causing the driver feel strange. Here, although exemplified in the above is the captured image 5101, the object B is also deformed similarly in the captured image S102.

Figure 7:
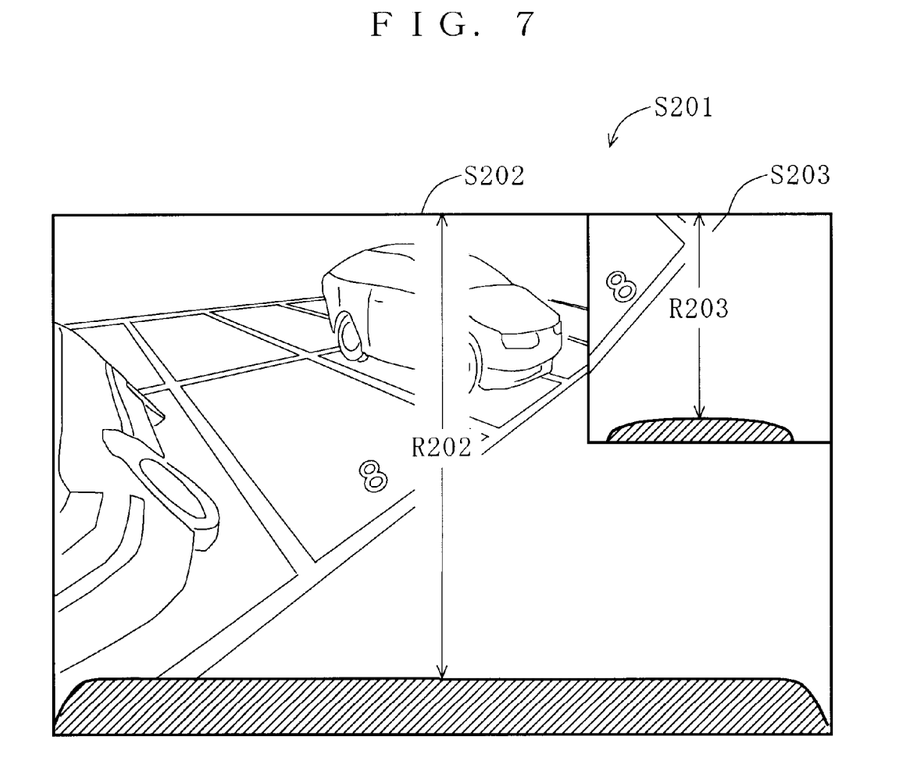
FIG. 7 is a diagram showing a range R203 of the upper viewpoint image S203 and a range R202 of a lower viewpoint image S202 shown in FIG. 4.

In such sense, it is preferable for the upper viewpoint image S203 not to include the object B. For the purpose, an area range R203 of the upper viewpoint image S203 is set relatively narrow as shown in FIG. 7. In such perspective, the area range R203 may be set to 2 m or so from the rear end of the vehicle Vusr (hatched area), for example. This is considered practical as the driver generally avoid objects (obstacles), and thus there are not so many objects in the close range to the vehicle Vusr. Here, the area range R203 is one example of a second range in Claims.

Described next is an advantage and drawback of the lower viewpoint image S202 in comparison with the upper viewpoint image 5203. Although the lower viewpoint image 5202 does not serve as the judgement criterion for the driver, the object B therein does not look deformed, substantially, as in the upper viewpoint image S203. Accordingly, the lower viewpoint image S202 can cover a relatively wide area without causing the driver feel strange. Thus, an area range R202 of the lower viewpoint image S202 may be set relatively wide as shown in FIG. 7. For example, the area range R202 is previously set to 10 m or so from the rear end of the vehicle Vusr (hatched area). Here, the area range R202 is one example of a first range in Claims.

As shown in FIG. 4, in this embodiment, the upper viewpoint image S203 is preferably arranged on the right side of the drive assistant image S201 in consideration of visibility for the driver. Specifically, the vehicle Vusr made in Japan carries the driver's seat on the right side. Further, the area range covered by the upper viewpoint image S203 is relatively narrow. Accordingly, the closer to the driver's seat, the better visibility the upper viewpoint image S203 can offer. In the case if the driver's seat is placed on the left side in the vehicle Vusr, the preferable position for the upper viewpoint image S203 is on the left side of the drive assistant image S201 for the same reason. If no viewability is given into consideration, the upper viewpoint image S203 is not restricted in its display position.

In this embodiment, the upper viewpoint image S203 is preferably placed at the upper end of the drive assistant image S201. If placed at the lower end, the upper viewpoint image S203 hides the road surface in the lower viewpoint image S202 from the driver who wants to know in what state the road surface is. In this sense, placing the upper viewpoint image S203 at the upper end is considered practical.

Figure 8:
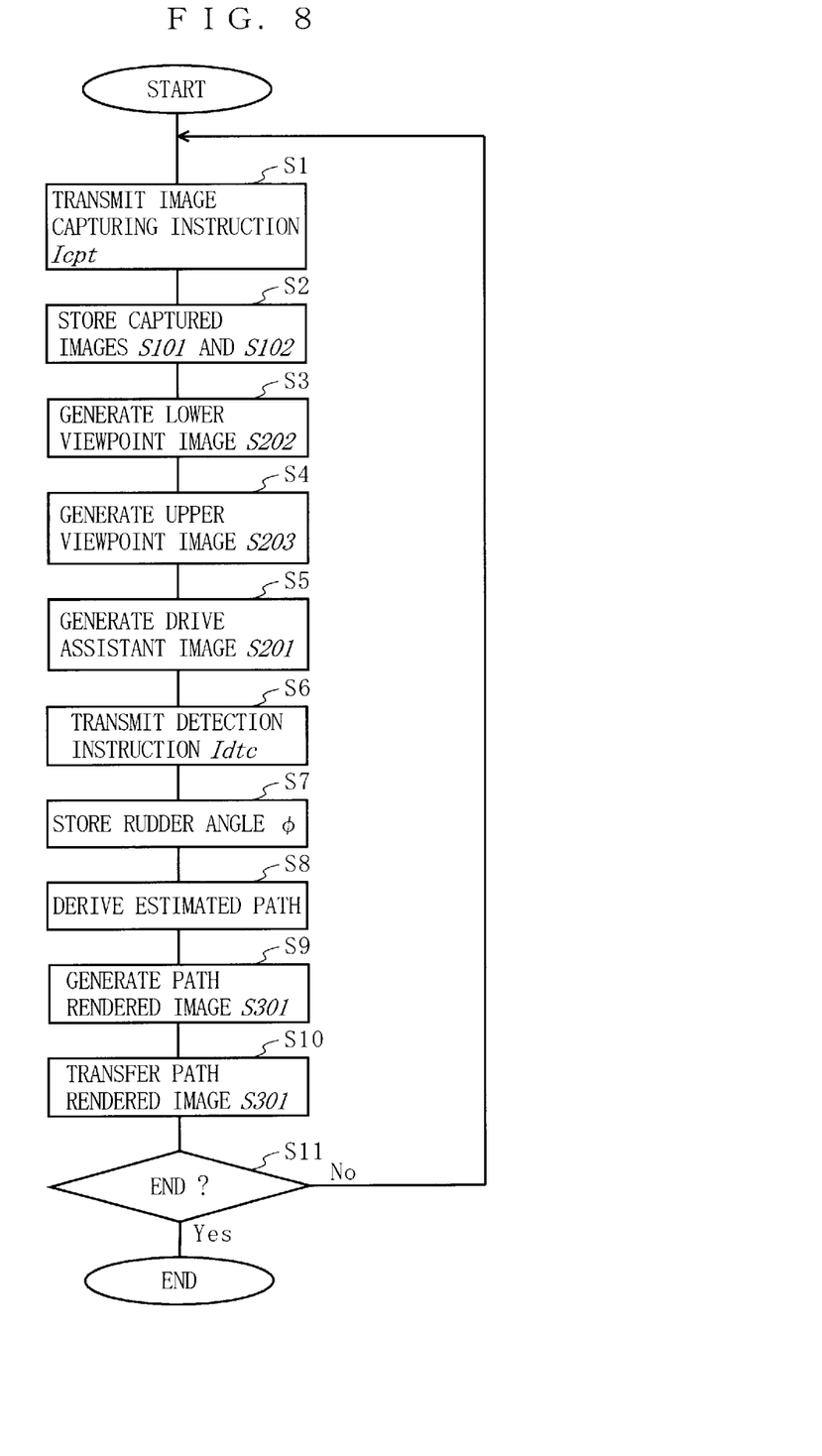
FIG. 8 is a flowchart showing the processing procedure of the CPU 7 written in a program PG1 shown in FIG. 1.

Described next is the operation of the above drive assistant device Uast1. When the driver wants assistance by the drive assistant device Uast1, for example, when moving the vehicle Vusr backward to park, the CPU 7 starts executing the program PG1. Here, FIG. 8 is a flowchart showing the processing procedure in the CPU 7 written in the program PG1. In FIG. 8, the CPU 7 first generates an image capturing instruction Icpt, and transmits it to the image capture devices 1 and 2 (step S1). The image capturing instruction Icpt is a signal instructing the image capture devices 1 and 2 for image capturing. In response to the instruction Icpt, the image capture devices 1 and 2 capture the above-described captured images S101 and S102, and store those images in the RAM 9 (step S2).

The CPU 7 then generates the lower viewpoint image S202, which is one part of the above-described drive assistant image 5201 (step S3). More in detail, in step S3, the CPU 7 stitches the captured images S101 and S102 stored in step S2 on the RAM 9. The resulting stitched image is the lower viewpoint image S202 (see FIG. 4) in the area range R202 viewed from the viewpoints of the image capture devices 1 and 2.

The CPU 7 then generates the upper viewpoint image S203, which is another part of the drive assistant image S201 (step S4). In more detail, in step S4, the above-described viewpoint conversion processing is carried out. First, in the viewpoint conversion processing, every obstacle in the captured images S101 and S102 stored in step S2 is projected onto the road surface, and spatial data is thus generated. Based on thus generated spatial data, generated is the upper viewpoint image S203 (see FIG. 4) in the area range R203 viewed from the virtual camera Cv (see FIG. 5) virtually placed above the vehicle Vusr.

The CPU 7 then stitches the upper viewpoint image S203 with the lower viewpoint image S202 on the RAM 9, and generates the drive assistant image S201 shown in FIG. 4 (step S5).

Then, the CPU 7 generates a detection instruction Idtc, and transmits it to the rudder angle sensor 3 (step S6). The detection instruction Idtc is a signal instructing the rudder angle sensor 3 to detect the rudder angle $\phi$. In response to the detection instruction Idtc, the rudder angle sensor 3 detects the rudder angle $\phi$, and stores it in the RAM 9 (step S7). Then, with the technique typified by the Ackermann's model, based on the rudder angle $\phi$ thus stored in step S7, the CPU 7 derives an estimated path for the vehicle Vusr to take in the course of time (step S8). Here, the estimated path means a path to be traced by the vehicle Vusr on condition that the driver keeps the steering wheel at the currently derived rudder angle $\phi$.

Figure 9:
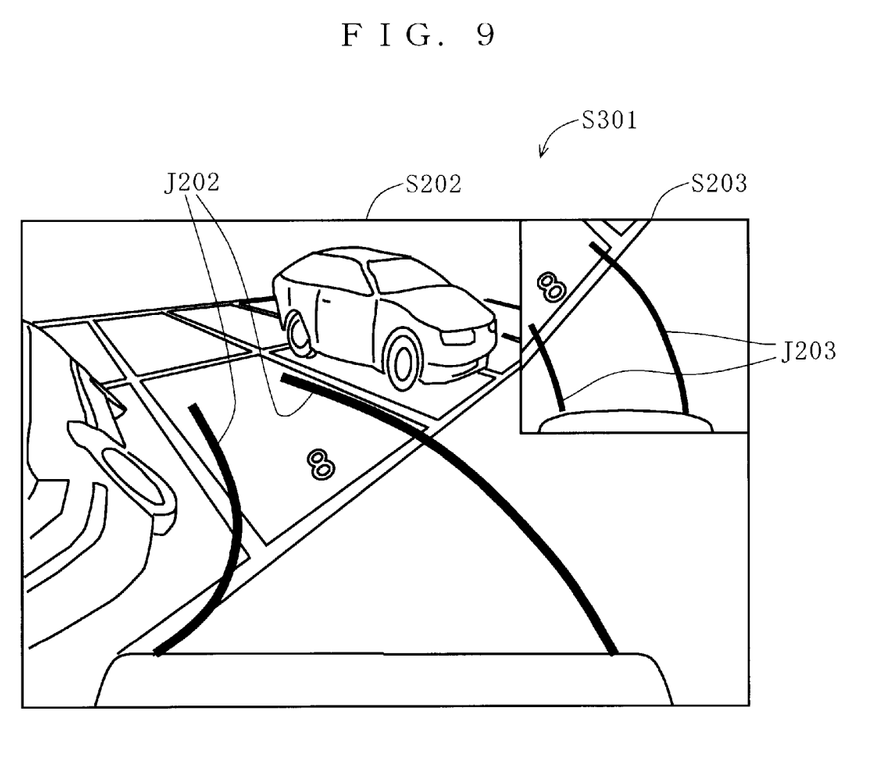
FIG. 9 is a diagram showing a path rendered image S301 generated in step S9 in FIG. 8.

Then, the CPU 7 generates such path rendered image S301 as shown in FIG. 9 (step S9). Specifically, on the lower and upper viewpoint images S202 and S203 structuring the drive assistant image S201 generated in step S5, the CPU 7 renders, respectively, objects J202 and J203 both indicative of the estimated path derived in step S8. Thus, with the upper viewpoint image S203 including the estimated path indicated by the objects J202, the driver can intuitively know how the vehicle Vusr will move from now, and judge whether the vehicle Vusr hits any obstacle in the close range. Further, with another estimated path rendered on the lower viewpoint image S202 covering the relatively wider area, the driver can quickly recognize whether the vehicle Vusr will fit in the parking space. Here, in step S9, rendering the objects onto both of the upper and lower viewpoint images S202 and S203 is not restrictive, and either of those images will do.

The CPU 7 then transfers the path rendered image S301 on the RAM 9 to the display device 4 for display thereon for the An driver (step S10). With the path rendered image S301 displayed, the driver can simultaneously see the lower and upper viewpoint images 5202 and S203 having each different characteristics. Accordingly, the present drive assistant device Uast1 can provide such technical effects as follows. As already described, the upper viewpoint image S203 shows the rear region R12 viewed from above. Thus, by seeing the upper viewpoint image S203, the driver can easily judge whether the vehicle Vusr is likely to hit any obstacle therearound, and also grasp the positional relationship between the vehicle Vusr and white lines defining an individual parking space. On the other hand, the lower viewpoint image S202 covers the relatively wide area range, and obstacles observed in the area range R202 are displayed with almost no deformation. Thus, by seeing the lower viewpoint image S202 in the path rendered image 5301, the driver can correctly perceive the rear area of the vehicle Vusr over the wider area range. As such, the present drive assistant device Uast1 can assist the driver to a considerable degree by offering both the lower and upper viewpoint images S202 and 5203.

After step S10 is through, the CPU 7 determines whether now is the time to end the processing of FIG. 8 (step S11). To see whether to end the processing, as one example, the CPU 7 checks whether the speed of the vehicle Vusr is 0 for a predetermined time interval. If Yes, the CPU 7 determines that the vehicle Vusr is now in the parking space, and thus ends the processing of FIG. 8. If not yet, the procedure returns to step Si to generate another path rendered image S301.

In the above embodiment, for the case of moving the vehicle Vusr backward to park, the image capture devices 1 and 2 are securely mounted to the rear end of the vehicle Vusr (see FIGS. 2A and 2B). Also for a case of moving the vehicle Vusr backward to be out from the parking space, the present drive assistant device Uast1 can be utilized.

Further, the attachment position of the image capture device is not limited to the rear end of the vehicle Vusr. For example, the front end, the left end, and/or the right end of the vehicle Vusr will also do. That is, the drive assistant image S201 may show not only the rear region R12 but also a front region, a left-side region, and/or a right-side region. In particular, the upper viewpoint image S203 may show the entire the region around the vehicle Vusr.

In the above embodiment, the drive assistant image S201 is structured by the lower and upper viewpoint images S202 and S203, both indicating the rear region R12. This is not restrictive in the drive assistant image S201, and the lower viewpoint image S202 may show the left-side region, and the upper viewpoint image S203 the rear region R12, for example. That is, the rendering device Urnd1 may generate such drive assistant image S201 as including the lower and upper viewpoint images S202 and S203 covering each different region.

Figure 10A:
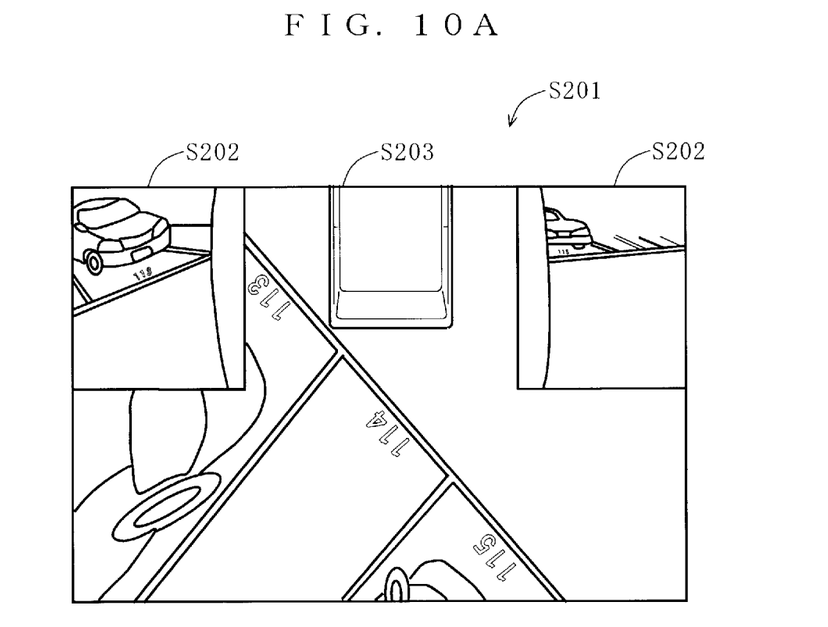
FIGS. 10A and 10B are diagrams showing another exemplary drive assistant image S201 generated by the CPU 7.
Figure 10B:
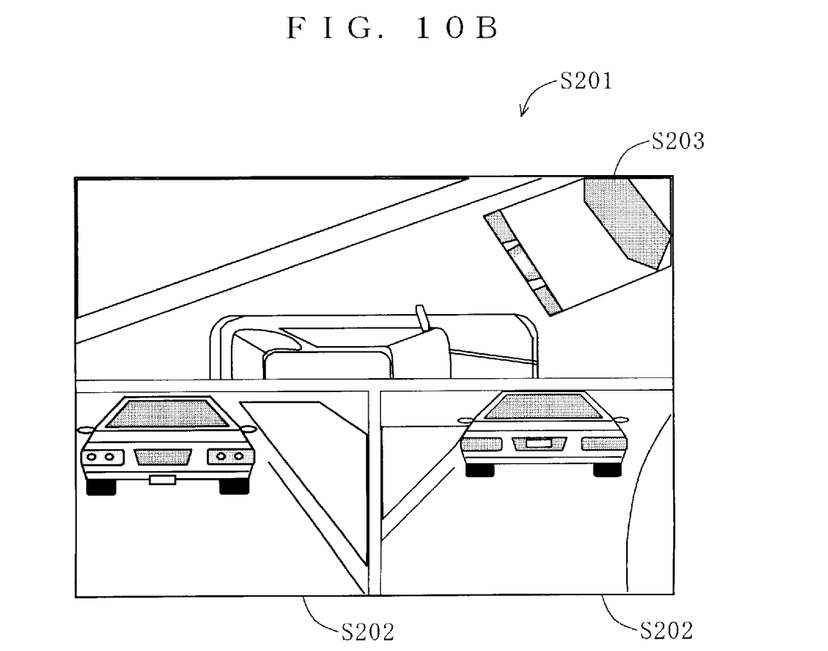

Further, as shown in FIGS. 10A and 10B, the drive assistant image S201 may include several lower viewpoint images S202 each covering a different region. In the example of FIG. 10A, the drive assistant image S201 includes two lower viewpoint images S202. One of those is arranged on the upper-left of the drive assistant image S201, and shows the rear-left region. The other is arranged on the upper-right of the drive assistant image S201, and shows the rear-right region.

In the example of FIG. 10B, the drive assistant image S201 also includes two lower viewpoint images S202. Here, one of those is arranged on the lower-left of the drive assistant image S201, and shows the rear-left region. The other is arranged on the lower-right of the drive assistant image S201, and shows a front-left region. Note here that, in order to generate such drive assistant image S201 as shown in FIG. 10B, the vehicle Vusr needs to carry at least two image capture devices on its left side.

Still further, in the above embodiment, the lower viewpoint image S202 is generated by stitching the captured images S101 and S102 together. This is not restrictive, and the rendering device Urnd1 may generate the lower viewpoint image S202 by stitching any part cut out from both the captured images S101 and S102. Alternatively, the lower viewpoint image S202 may be so generated as to cover the area range S202, which is viewed from the virtual camera Cv placed in close proximity to the image capture devices 1 and 2. In this case, the virtual camera Cv may also be placed in the vicinity of a headrest in the vehicle Vusr (i.e., proximal to the driver's eyes). Such viewpoints of the virtual camera Cv is another example of the first viewpoint in Claims.

Still further, in the above embodiment, two image capture devices 1 and 2 are used to capture an image of the rear region R12. This is not restrictive, and one image capture device will do if a lens thereof has a wide viewing angle.

Also in the above, displayed on the display device 4 is the path rendered image S301. This is not restrictive, and the drive assistant device Uast1 may be so structured as to display the drive assistant image S201, as it is, on the display image 4.

In the above embodiment, the program PG1 is stored in the ROM 8. This is not restrictive, and the program PG1 may be distributed in a recording medium typified by CD-ROM, or over a communications network such as the Internet.

While the invention has been described in detail, the foregoing description is in all aspects illustrative and not restrictive. It is understood that numerous other modifications and variations can be devised without departing from the scope of the invention.

What is claimed is:

1. A rendering device for generating a drive assistant image for drive assistance, comprising:
    a reception part for receiving an image captured by an image capture device placed in a vehicle;
    a first image generating part for generating, based on the captured image received by said reception part, a lower viewpoint image showing a surrounding region of said vehicle viewed from a first viewpoint;
    a second image generating part for generating, based on the captured image received by said reception part, an upper viewpoint image showing said surrounding region viewed from a second viewpoint differing from said first viewpoint; and
    a third image generating part for generating the drive assistant image including the lower viewpoint image generated by said first image generating part, and the upper viewpoint image generated by said second image generating part; wherein
    a first angle formed between a road surface and a direction of said first viewpoint to said surrounding region is smaller than a second angle formed between the road surface and a direction of said second viewpoint to said surrounding region.

2. The rendering device according to claim 1, wherein said first image generating part generates the lower viewpoint image showing a first range in said surrounding region viewed from said first viewpoint,
    said second image generating part generates the upper viewpoint image showing a second range in said surrounding region viewed from said second viewpoint, and
    said second range is narrower than said first range.

3. The rendering device according to claim 1, wherein said second viewpoint is a virtual viewpoint previously set above said vehicle, and
    said second image generating part executes viewpoint conversion processing onto the captured image received by said reception part, and generates the upper viewpoint image showing said surrounding region viewed from said virtual viewpoint.

4. The rendering device according to claim 1, wherein said first viewpoint is a virtual viewpoint previously set in close proximity to said image capture device, and
    said first image generating part executes viewpoint conversion processing onto the captured image received by said reception part, and generates the lower viewpoint image showing said surrounding region viewed from said virtual viewpoint.

5. The rendering device according to claim 1, wherein said first viewpoint is a virtual viewpoint previously set in close proximity to an eye position of a driver of said vehicle, and
    said first image generating part executes viewpoint conversion processing onto the captured image received by said reception part, and generates the lower viewpoint image showing said surrounding region viewed from said virtual viewpoint.

6. The rendering device according to claim 1, wherein said third image generating part arranges the upper viewpoint image generated by said second image generating part on a side of the drive assistant image closer to a driver's seat in said vehicle.

7. The rendering device according to claim 1, wherein said third image generating part arranges the upper viewpoint image generated by said second image generating part on an upper side of the drive assistant image.

8. The rendering device according to claim 1, further comprising:

a derivation part for deriving, based on a rudder angle of said vehicle detected by a rudder angle sensor placed in the vehicle, an estimated path for said vehicle to take in a course of time; and a path rendering part for rendering, on the upper viewpoint image and/or the lower viewpoint image structuring the drive assistant image generated by said third image generating part, an object indicative of the estimated path derived by said derivation part.

9. A rendering method for generating a drive assistant image for drive assistance, comprising:

a receiving step of receiving an image captured by an image capture device placed in a vehicle;

a first image generating step of generating, based on the captured image received in said receiving step, a lower viewpoint image showing a surrounding region of said vehicle viewed from a first viewpoint;

a second image generating step of generating, based on the captured image received in said receiving step, an upper viewpoint image showing said surrounding region viewed from a second viewpoint differing from said first viewpoint; and a third image generating step of generating the drive assistant image including the lower viewpoint image generated in said first image generating step, and the upper viewpoint image generated in said second image generating step; wherein a first angle formed between a road surface and a direction of said first viewpoint to said surrounding region is smaller than a second angle formed between the road surface and a direction of said second viewpoint to said surrounding region.

10. The rendering method according to claim 9, wherein in said first image generating step, the lower viewpoint image showing a first range in said surrounding region viewed from said first viewpoint is generated, in said second image generating step, the upper viewpoint image showing a second range in said surrounding region viewed from said second viewpoint is generated, and said second range is narrower than said first range.

11. The rendering method according to claim 9, wherein said second viewpoint is a virtual viewpoint previously set above said vehicle, and in said second image generating step, viewpoint conversion processing is executed to the captured image received in said receiving step, and the upper viewpoint image showing said surrounding region viewed from said virtual viewpoint is generated.

12. The rendering method according to claim 9, wherein said first viewpoint is a virtual viewpoint previously set in close proximity to said image capture device, and in said first image generating step, viewpoint conversion processing is executed to the captured image received in said reception step, and the lower viewpoint image showing said surrounding region viewed from said virtual viewpoint is generated.

13. The rendering method according to claim 9, wherein said first viewpoint is a virtual viewpoint previously set in close proximity to an eye position of a driver of said vehicle, and in said first image generating step, viewpoint conversion processing is executed to the captured image received in said receiving step, and the lower viewpoint image showing said surrounding region viewed from said virtual viewpoint is generated.

14. A recording medium with a program recorded for generating a drive assistant image for drive assistance, said program comprising:

a receiving step of receiving an image captured by an image capture device placed in a vehicle;

a first image generating step of generating, based on the captured image received in said receiving step, a lower viewpoint image showing a surrounding region of said vehicle viewed from a first viewpoint;

a second image generating step of generating, based on the captured image received in said receiving step, an upper viewpoint image showing said surrounding region viewed from a second viewpoint differing from said first viewpoint; and a third image generating step of generating the drive assistant image including the lower viewpoint image generated in said first image generating step, and the upper viewpoint image generated in said second image generating step; wherein a first angle formed between a road surf ace and a direction of said first viewpoint to said surrounding region is smaller than a second angle formed between the road surface and a direction ht of said second viewpoint to said surrounding region.

15. The recording medium with the program recorded according to claim 14, wherein in said first image generating step, the lower viewpoint image showing a first range in said surrounding region viewed from said first viewpoint is generated, in said second image generating step, the upper viewpoint image showing a second range in said surrounding region viewed from said second viewpoint is generated, and said second range is narrower than said first range.

16. The recording medium with the program recorded according to claim 14, wherein said second viewpoint is a virtual viewpoint previously set above said vehicle, and in said second image generating step, viewpoint conversion processing is executed to the captured image received in said receiving step, and the upper viewpoint image showing said surrounding region viewed from said virtual viewpoint is generated.

17. The recording medium with the program recorded according to claim 14, wherein said first viewpoint is a virtual viewpoint previously set in close proximity to said image capture device, and in said first image generating step, viewpoint conversion processing is executed to the captured image received in said reception step, and the lower viewpoint image showing said surrounding region viewed from said virtual viewpoint is generated.

18. The recording medium with the program recorded according to claim 14, wherein said first viewpoint is a virtual viewpoint previously set in close proximity to an eye position of a driver of said vehicle, and in said first image generating step, viewpoint conversion processing is executed to the captured image received in said receiving step, and the lower viewpoint image showing said surrounding region viewed from said virtual viewpoint is generated.

19. A program for generating a drive assistant image for drive assistance, comprising:

a receiving step of receiving an image captured by an image capture device placed in a vehicle;

a first image generating step of generating, based on the captured image received in said receiving step, a lower viewpoint image showing a surrounding region of said vehicle viewed from a first viewpoint;

a second image generating step of generating, based on the captured image received in said receiving step, an upper viewpoint image showing said surrounding region viewed from a second viewpoint differing from said first viewpoint; and a third image generating step of generating the drive assistant image including the lower viewpoint image generated in said first image generating step, and the upper viewpoint image generated in said second image generating step; wherein a first angle formed between a road surface and a direction of said first viewpoint to said surrounding region is smaller than a second angle formed between the road surface and a direction of said second viewpoint to said surrounding region.

20. The program according to claim 19, wherein in said first image generating step, the lower viewpoint image showing a first range in said surrounding region viewed from said first viewpoint is generated, in said second image generating step, the upper viewpoint image showing a second range in said surrounding region viewed from said second viewpoint is generated, and said second range is narrower than said first range.

21. The program according to claim 19, wherein said second viewpoint is a virtual viewpoint previously set above said vehicle, and in said second image generating step, viewpoint conversion processing is executed to the captured image received in said receiving step, and the upper viewpoint image showing said surrounding region viewed from said virtual viewpoint is generated.

22. The program according to claim 19, wherein said first viewpoint is a virtual viewpoint previously set in close proximity to said image capture device, and in said first image generating step, viewpoint conversion processing is executed to the captured image received in said reception step, and the lower viewpoint image showing said surrounding region viewed from said virtual viewpoint is generated.

23. The program according to claim 19, wherein said first viewpoint is a virtual viewpoint previously set in close proximity to an eye position of a driver of said vehicle, and in said first image generating step, viewpoint conversion processing is executed to the captured image received in said receiving step, and the lower viewpoint image showing said surrounding region viewed from said virtual viewpoint is generated.

* * * * *